(12) United States Patent
King et al.

(10) Patent No.: US 7,960,855 B2
(45) Date of Patent: Jun. 14, 2011

(54) SYSTEM AND METHOD FOR PROVIDING POWER CONTROL OF AN ENERGY STORAGE SYSTEM

(75) Inventors: Robert Dean King, Schenectady, NY (US); Dongwoo Song, Santa Clara, CA (US); Lembit Salasoo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 219 days.

(21) Appl. No.: 11/012,442

(22) Filed: Dec. 15, 2004

(65) Prior Publication Data

US 2006/0125319 A1 Jun. 15, 2006

(51) Int. Cl.
*H02J 7/34* (2006.01)
*B60L 15/00* (2006.01)

(52) U.S. Cl. ............ 307/10.1; 307/9.1; 307/46

(58) Field of Classification Search .......... 307/71, 307/9.1, 10.1, 46
See application file for complete search history.

(56) References Cited

U.S. PATENT DOCUMENTS

| | | | | |
|---|---|---|---|---|
| 4,119,862 A | | 10/1978 | Gocho | |
| 4,333,149 A | * | 6/1982 | Taylor et al. | 702/63 |
| 4,433,278 A | * | 2/1984 | Lowndes et al. | 320/116 |
| 5,373,196 A | | 12/1994 | Faley | 307/46 |
| 5,426,561 A | * | 6/1995 | Yen et al. | 361/502 |
| 5,451,881 A | * | 9/1995 | Finger | 324/433 |
| 5,652,501 A | * | 7/1997 | McClure et al. | 340/636.15 |
| 5,659,240 A | | 8/1997 | King | |
| 5,698,965 A | * | 12/1997 | York | 307/130 |
| 5,710,699 A | * | 1/1998 | King et al. | 363/132 |
| 5,903,449 A | | 5/1999 | Garrigan et al. | 363/41 |
| 5,995,396 A | | 11/1999 | Byrne et al. | |
| 6,091,228 A | * | 7/2000 | Chady et al. | 320/132 |
| 6,331,365 B1 | | 12/2001 | King | 429/9 |
| 6,356,083 B1 | * | 3/2002 | Ying | 324/426 |
| 6,392,415 B2 | * | 5/2002 | Laig-Horstebrock et al. | 324/433 |
| 6,441,586 B1 | * | 8/2002 | Tate et al. | 320/132 |
| 6,653,817 B2 | * | 11/2003 | Tate et al. | 320/132 |
| 7,038,333 B2 | * | 5/2006 | Bourilkov et al. | 307/46 |
| 7,074,157 B2 | * | 7/2006 | Wakashiro et al. | 477/7 |
| 7,078,877 B2 | * | 7/2006 | Salasoo et al. | 320/104 |
| 7,233,128 B2 | * | 6/2007 | Brost et al. | 320/132 |
| 2005/0284676 A1 | * | 12/2005 | King et al. | 180/65.3 |

FOREIGN PATENT DOCUMENTS

| EP | 1000796 | 5/2000 |
|---|---|---|
| GB | 1456603 | 11/1976 |

OTHER PUBLICATIONS

EP Search Report, EP05257549, Sep. 10, 2009.

* cited by examiner

*Primary Examiner* — Jared J Fureman
*Assistant Examiner* — Adi Amrany
(74) *Attorney, Agent, or Firm* — Ann M. Agosti

(57) ABSTRACT

A control circuit comprises a circuit adapted to determine a state of charge of a high side power source using a sensed output current to provide a variable gain signal based on the state of charge. The control circuit may also contain a circuit configured to provide a fixed gain signal based on the current of the high side power source and a circuit configured to combine the variable gain signal and the fixed gain signal to create a power command.

17 Claims, 9 Drawing Sheets

SYSTEM AND METHOD FOR PROVIDING POWER CONTROL OF AN ENERGY STORAGE SYSTEM

BACKGROUND

The invention relates in general to hybrid vehicle systems, and in particular to power control of energy storage in hybrid electric drives and vehicle systems. Hybrid systems are advantageous due to their ability to increase the fuel efficiency of the vehicle system and to reduce air pollution.

Typically, hybrid vehicle systems include a low side power source and a high side power source. The low side power source and the high side power source operate in conjunction to supply power to a device such as a motor, which may be used, for example, to propel a hybrid vehicle. The low side power source, which typically has a high energy density, may comprise a battery, a heat engine, an ultracapacitor, a flywheel or the like. The heat engine may include any engine that burns a fuel to produce mechanical work, such as an internal combustion engine, a turbine engine, a diesel engine or the like.

Some vehicles use electric traction motors as a component of the high side power source. Electric traction motors are typically connected to a link, such as a power bus to deliver power to the motor. One or more on-board alternators may be used to provide the power to the link. Under certain operating conditions, such as when the vehicle is decelerating or is maintaining speed on a downhill grade, the back electromotive force ("EMF") produced by the electric motors is greater than the nominal voltage of the power bus dc link. Under such conditions, the electric traction motor may cease acting as a motor and become a generator. This process, known as dynamic braking may be used to reduce wear on the mechanical brake system components of a vehicle. In the case where the vehicle is a locomotive, dynamic braking may reduce brake wear on the locomotive and also on all of the rail cars of the train. A grid resistor may be used to dissipate the electric power as heat produced by the electric motor during dynamic braking. Additionally, systems have been developed to recover some of the energy that is typically wasted as heat during dynamic braking. The recovery of this wasted energy is known as regenerative braking.

In series hybrid vehicle systems, the power source and associated controls may be operated in an "on/off" mode, where the energy source when it is "on" operates at a predetermined speed or possibly over a narrow speed range to recharge the high side power source, which may comprise a traction battery. The traction battery is typically operated in a manner that allows for either periodic discharge during vehicle acceleration, or recharge during periods of regenerative braking when the vehicle is decelerated or maintaining speed. In other words, one method of controlling the traction battery is to operate the low side power source to maintain the state of charge (SOC) of the traction battery within a given range. However, the transient response of such systems is reduced when a sudden high power vehicle maneuver is required during the period when the power source is in the "off" mode.

There is, accordingly, a need to provide an improved method and system to control the operation of the low side power source and the high side power source in a hybrid vehicle.

BRIEF DESCRIPTION

In accordance with one aspect of the present technique a power control system for an energy storage system is disclosed. The power control system includes a control unit comprising: a circuit adapted to determine a state of charge of an energy storage unit in a high side power source and to provide a variable gain signal based on the state of charge. The control circuit further comprises a circuit configured to provide a fixed gain signal based on the current of the high side power source and a circuit configured to combine the variable gain signal and the fixed gain signal to create a power command.

In accordance with another aspect of the present technique, a power system comprising a low side power source coupled to a traction boost converter, a high side power source coupled to an output of the traction boost converter and a control circuit configured to control a power output of the low side power source based on a state of charge of the high side power source is disclosed.

In accordance with yet another aspect of the present technique a method is described for operating a control circuit.

DRAWINGS

These and other features, aspects, and advantages of the present invention will become better understood when the following detailed description is read with reference to the accompanying drawings in which like characters represent like parts throughout the drawings, wherein.

Figure 8:
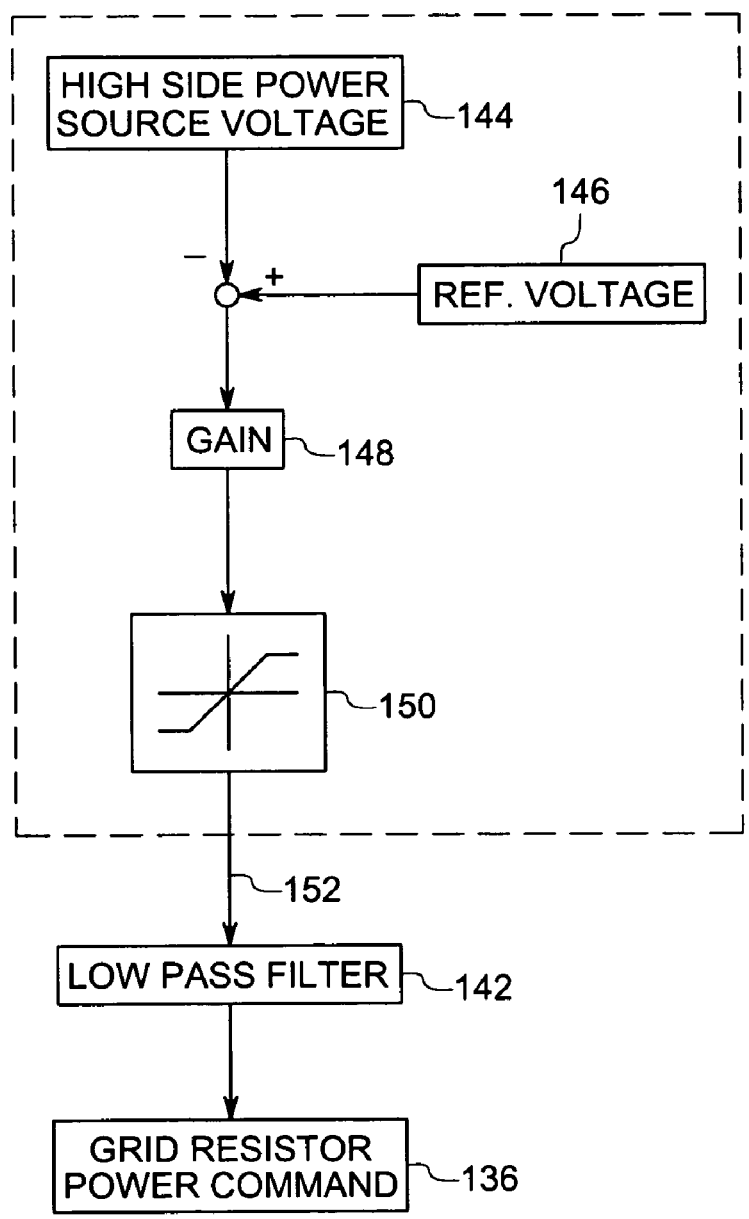
Figure 9:
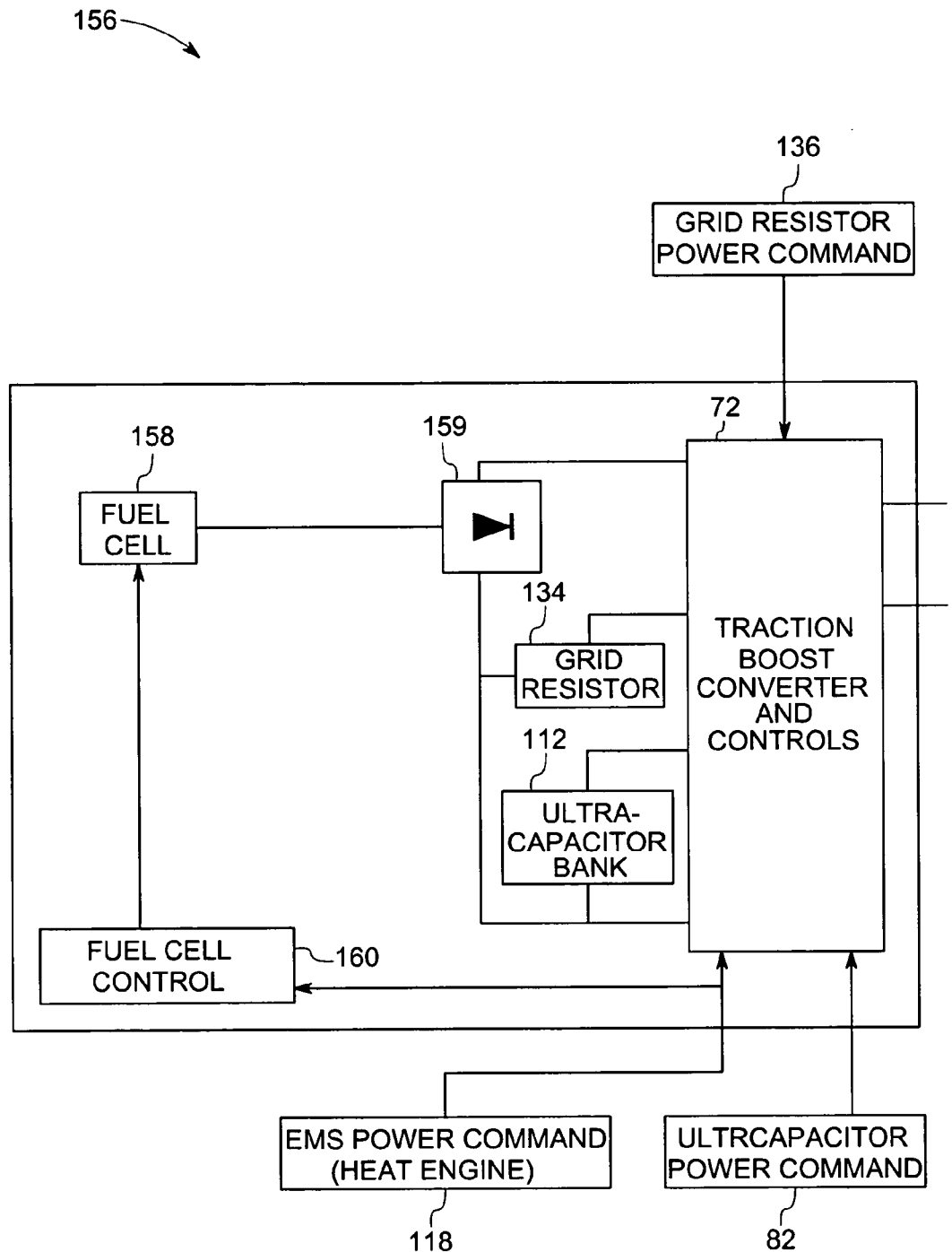

FIG. 8 is a schematic diagram of a hybrid vehicle system illustrating a control circuit for over-voltage protection of the high side power source, a grid resistor power command and a low pass filter, in accordance with an exemplary embodiment of the present technique; and FIG. 9 is a schematic diagram of a hybrid vehicle system illustrating a fuel cell, an ultracapacitor bank with power command input, a grid resistor with power command input and a fuel cell power command input, in accordance with yet another exemplary embodiment of the present technique.

DETAILED DESCRIPTION

In the subsequent paragraphs, for a better understanding of the various aspects of the present techniques, the different circuits, systems, and methods for implementation of the different aspects for the method for providing power control to the energy storage system will be described in greater detail. The various aspects of the present techniques will be explained, by way of example only, with the aid of figures hereinafter.

Figure 1:
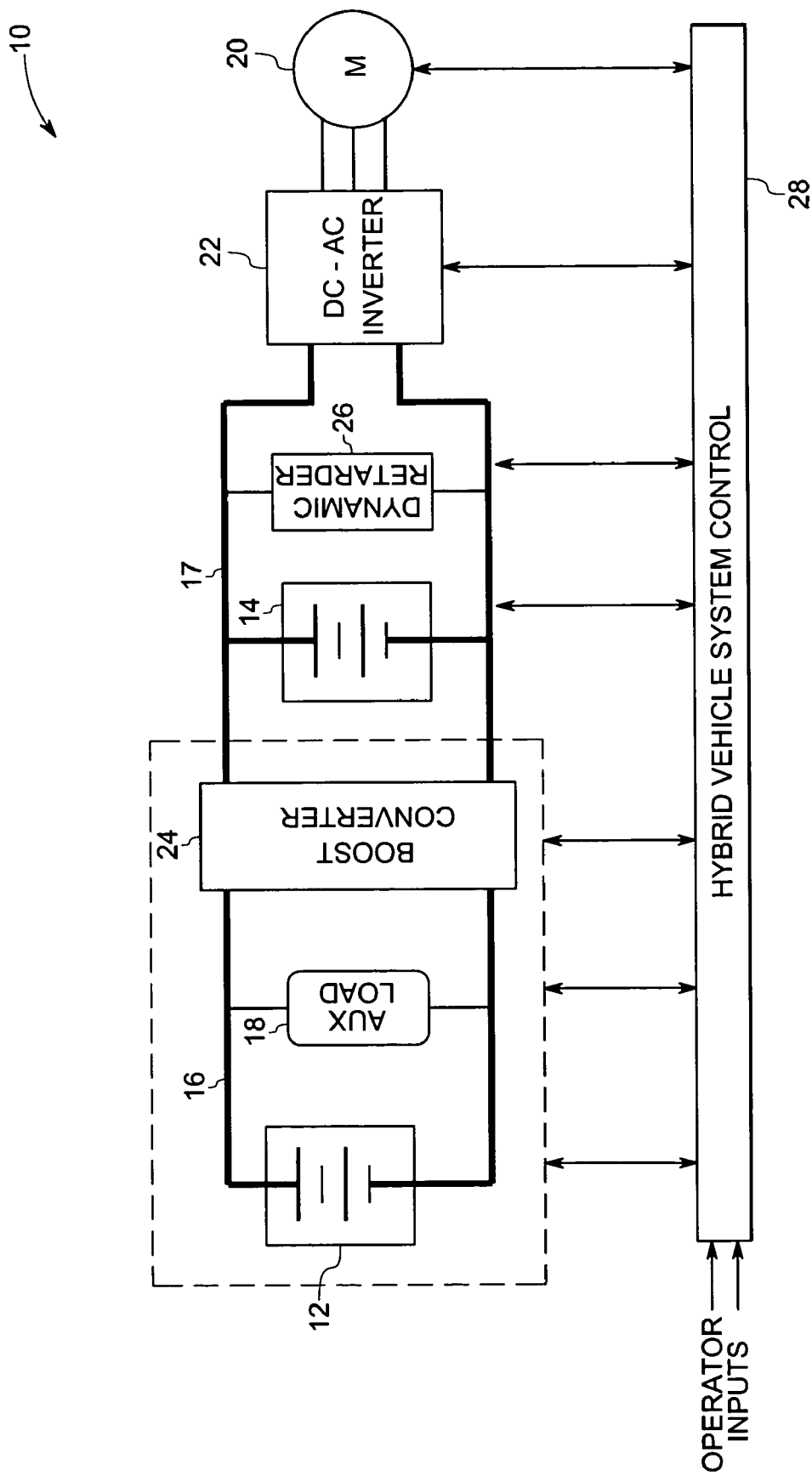
FIG. 1 is a schematic diagram of a hybrid vehicle system illustrating a low side power source and a high side power source, in accordance with an exemplary embodiment of the present technique.

Turning now to the drawings, FIG. 1 is a schematic diagram of an exemplary hybrid vehicle system 10 having a low side power source 12 and a high side power source 14, in accordance with certain aspects of the present technique. The high side power source 14 may additionally be referred to as a high side power source 14 herein. The low side power source is coupled to a traction drive system (not shown) by a direct current (DC) link 16. The low side power source 12 may be used to supply power to one or more auxiliary loads 18. The low side power source 12 and the high side power source 14 operate in conjunction to supply power to a device such as a motor 20, which may be used, for example, to propel a hybrid vehicle. In the embodiment illustrated in FIG. 1, the low side power source 12 comprises a high-energy battery and the high side power source 14 comprises a high power battery. The low side power source 12 may be re-chargeable by an auxiliary power unit (not shown). Alternatively, the auxiliary power unit may also charge the high side power source 14. As will be appreciated by those of ordinary skill in the art, the auxiliary power unit may comprise a heat engine coupled to an alternator with an associated rectifier.

The low side power source 12 may be any of a variety of re-chargeable batteries, such as a lithium ion battery, a nickel metal-hydride battery, a sodium-sulfur battery, a sodium nickel chloride battery, among others. The high side power source 14 may comprise a high specific power nickel-cadmium battery, nickel-metal hydride, sodium nickel chloride, or lead acid, among others commonly known in the art. In one embodiment, either the low side or high side power sources may include an ultracapacitor. In yet another embodiment, the high side power source 14 may comprise a flywheel.

During acceleration of the vehicle, or when the vehicle is climbing steep grades, the high side power source 14 operates in a state of discharge, to augment electrical power output of the low side power source 12. This provides high power levels for a period of time that varies depending on the design of the high side power source 14. During braking, the high side power source 14 is operating in a state of re-charge to regeneratively capture a portion of the energy typically wasted during braking. Accordingly, optimal maintenance of the charge in the high side power source 14 may be desirable to adequately provide for power discharge during acceleration and re-charge during regenerative braking.

The hybrid vehicle system 10 is adapted to allow a host hybrid vehicle to recover some of the energy that is typically wasted as heat during dynamic braking. The recovery of this wasted energy is known as regenerative braking. During periods of regenerative braking, the low side power source 12 may also be partially recharged using the regenerative energy from the traction drive. In the illustrated embodiment, the low side power source 12 and the high side power source 14 may comprise electrically re-chargeable batteries. The low side power source 12 may have a higher energy density than the high side power source 14, which may have a higher power density than the low side power source 12. This relationship allows the high side power source 14 to provide a surge of power to an associated traction drive system for acceleration or under heavy load conditions.

The traction drive system (not shown) comprises at least one traction motor 20, rotationally coupled to a wheel via a mechanical transmission drive (not shown). In this embodiment, the motor 20 may comprise an alternating current (AC) motor. An inverter 22 is provided to invert the direct current on a DC link 17 to an alternating current for use by the motor 20. However, as one skilled in the art would appreciate, a DC motor may also be used.

Additionally, the illustrated system 10 includes a boost converter 24 that increases the voltage provided by the low side power source 12. The DC link 17 connects the output of the boost converter 24 to the high side power source 14, a dynamic retarder 26 and an input to a DC-AC inverter 22. The boost converter 24 is controllable in a manner that facilitates regulation for the amount of power drawn from the low side power source 12 to power the motor 22 and to charge the high side power source 14. The dynamic retarder 26, including an associated controller, is provided to control the voltage on the DC link 17 across the high side power source 14 to contain the voltage within acceptable levels above a normal operating voltage of the high side power source 14. Furthermore, the low side power source 12 may be used to supply power to one or more auxiliary loads across the terminals of the low side power source 12.

The low side power source 12 may comprise a single battery or a plurality of parallel coupled batteries each connected to the low side DC link 16. Further, it may be desirable to electrically separate multiple batteries and have each such battery connected to the DC link 17 by a separate boost converter. Multiple batteries and boost converters 24 may be employed to provide fault tolerance. If one of the batteries malfunctions, disabling the boost converter 24 can be used to effectively remove the defective battery from the assembly.

Typically, during normal operating conditions, the traction drive system is powered by the low side power source 12, wherein power flows along the DC links 16 and 17. When acceleration is desired or the traction drive system is under heavy load conditions, additional power is drawn from the high side power source 14. During braking, a portion of the regenerative braking energy produced within the traction drive system is transferred from the motor to the high side power source 14. As a result, power flows from the traction motor 20 to the high side power source 14. The power from the motor 20 is used to partially re-charge the high side power source 14 and may also be used to partially recharge the low side power source through the bi-directional boost converter 24. The system 10 further includes hybrid vehicle system controls 28 for controlling the overall operation of all the components of the system 10. The various parameters of the hybrid vehicle system controls 28 are controlled and manipulated by providing suitable inputs by the operator.

Figure 2:
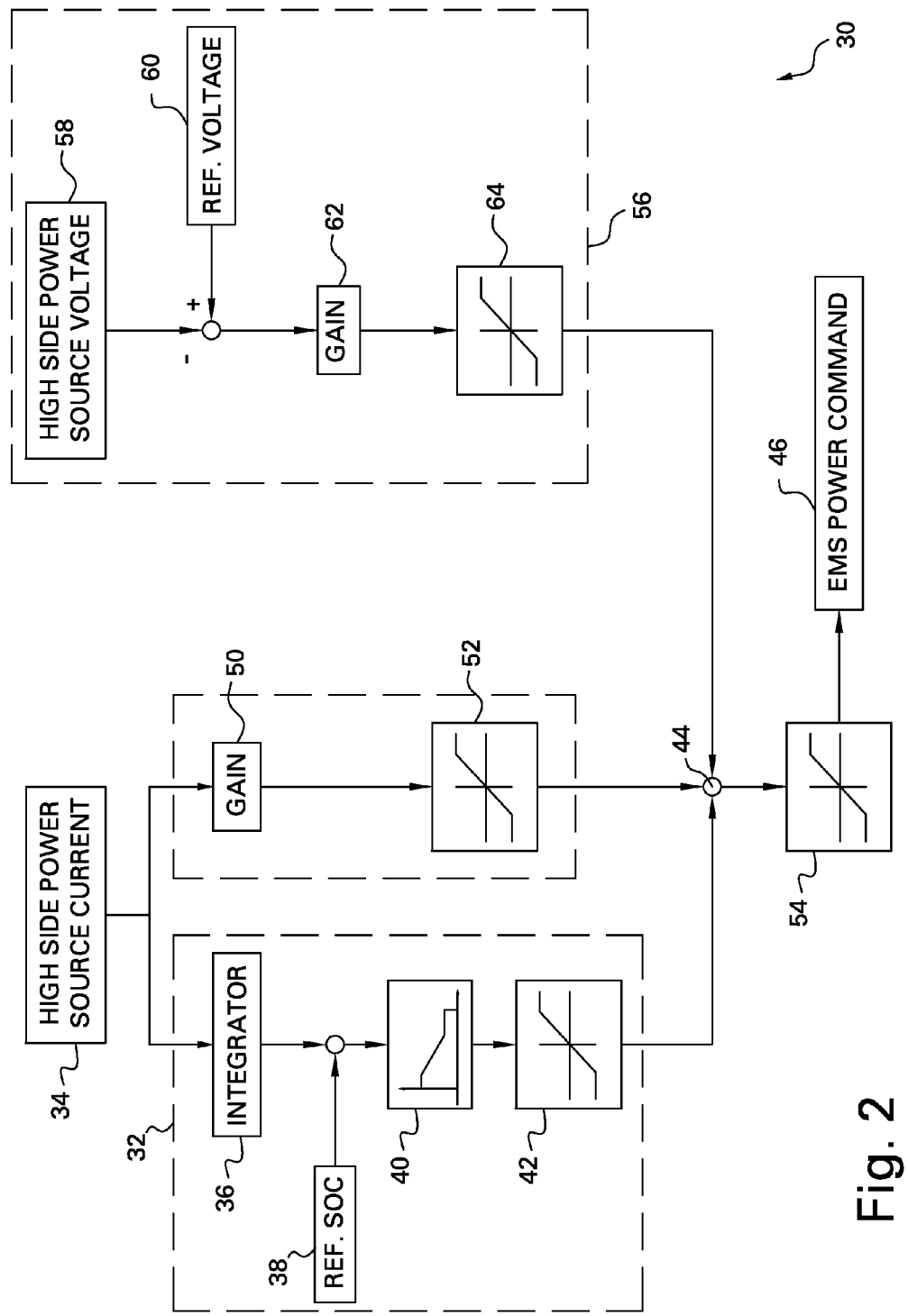
FIG. 2 is a schematic diagram of a control circuit of a hybrid vehicle system, in accordance with an exemplary embodiment of the present technique.

FIG. 2 illustrates a schematic diagram of an exemplary control circuit 30 of a hybrid vehicle system, in accordance with an exemplary embodiment of the present technique. The control circuit 30 includes a circuit 32 adapted to determine a State of Charge, (SOC), of an energy storage system source current 34 in a high side power source 14. The circuit 32 is referred as a variable gain circuit. The source current 34 is delivered to an integrator 36 where it is combined with a reference SOC 38. The resulting signal is delivered to a gain adjustment circuit 40. The output of the gain adjustment circuit 40 is delivered to an SOC power limit function 42. In accordance with an aspect of the present technique, the value of the output of the integrator 36, which may be expressed in net ampere-hours (AH), may be used as an estimate of SOC. Comparison of the net AH with the reference AH through the gain adjustment circuit 40 and SOC power limit function 42 forms an input to the summation circuit 44.

The variable gain circuit 32 provides the necessary gain input to generate an appropriate power command 46, which is provided to a traction boost converter. The traction boost converter will be described in later sections. As will be appreciated by a person skilled in the art, the variable gain circuit 32 may be utilized to provide the gain to maintain the SOC within acceptable values during variation of driving conditions.

The high side power source current 34 is additionally delivered to a control circuit 48, for providing a fixed gain 50 to the high side power source current 34. It should be particularly noted that unlike the variable gain circuit 32 described earlier, control circuit 48 provides necessary gain 50 to generate the power command 46 during conditions where acceleration or braking is required within a limited time i.e., for conditions that may not be anticipated by a system operator. The fixed gain circuit 48 comprises the fixed gain circuit 50 and a power limit circuit 52. The outputs of the SOC power limit function 42 of the variable gain circuit 32 and the power limit circuit 52 of the fixed gain circuit 48 are combined by the summation circuit 44. As will be further appreciated by a person skilled in the art, the combination of the variable gain circuit 32 and the fixed gain circuit 48 generates the power command 46 with an overall power limit function 54 that facilitates operation of the low side power source 12, high side power source 14, and traction motors 20 in extremes of conditions.

The control circuit 30 further comprises an over voltage protection circuit 56 adapted to protect the high side power source from an over voltage condition. The over voltage protection is computed by subtracting the measured voltage 58 of the high side power source 14 from a reference voltage 60, and then applying an appropriate gain 62 and power limit function 64. The output of the over voltage protection circuit 56 combines with the fixed gain circuit 32 and the variable gain circuit 48 in the summation circuit 44. The combination 50 of these circuits (32, 48 and 56) are computed by an algorithm to create the power command 46 with the overall power limit function 54 for energy management. The power command 46 is transmitted as an input to the traction boost converter as will be explained in FIG. 3 below.

The power command 46 may be used to adjust the power flow to the high side power source 14 so that it provides power for acceleration when needed and accepts available power generated during regenerative braking. During heavy vehicle load conditions, including accelerations and hill climbing, the power command 46 is increased to correspond to the maximum rated power, augmenting the power from the high side power source 14. In addition, the power command 46 operates to conserve power of the high side power source 14 during light vehicle load conditions, i.e. cruise on level pavement at moderate constant speeds. In these situations, the power command 46 is reduced to improve system efficiency, increase fuel economy and reduce emissions from the vehicle. During both light and moderate vehicle load conditions, the variable gain circuit 32 component of the power command 46, as described in FIG. 2, operates to maintain SOC of the high side power source within acceptable limits. It should be however noted that, the control concepts discussed herein, can be applied to hybrid systems, independent of the fuel used in the energy source, i.e. electricity from mechanically or electrically recharged batteries, ultracapacitor, or fuel cells; diesel, gasoline, compressed natural gas, or hydrogen; or flywheel energy storage systems.

Figure 3:
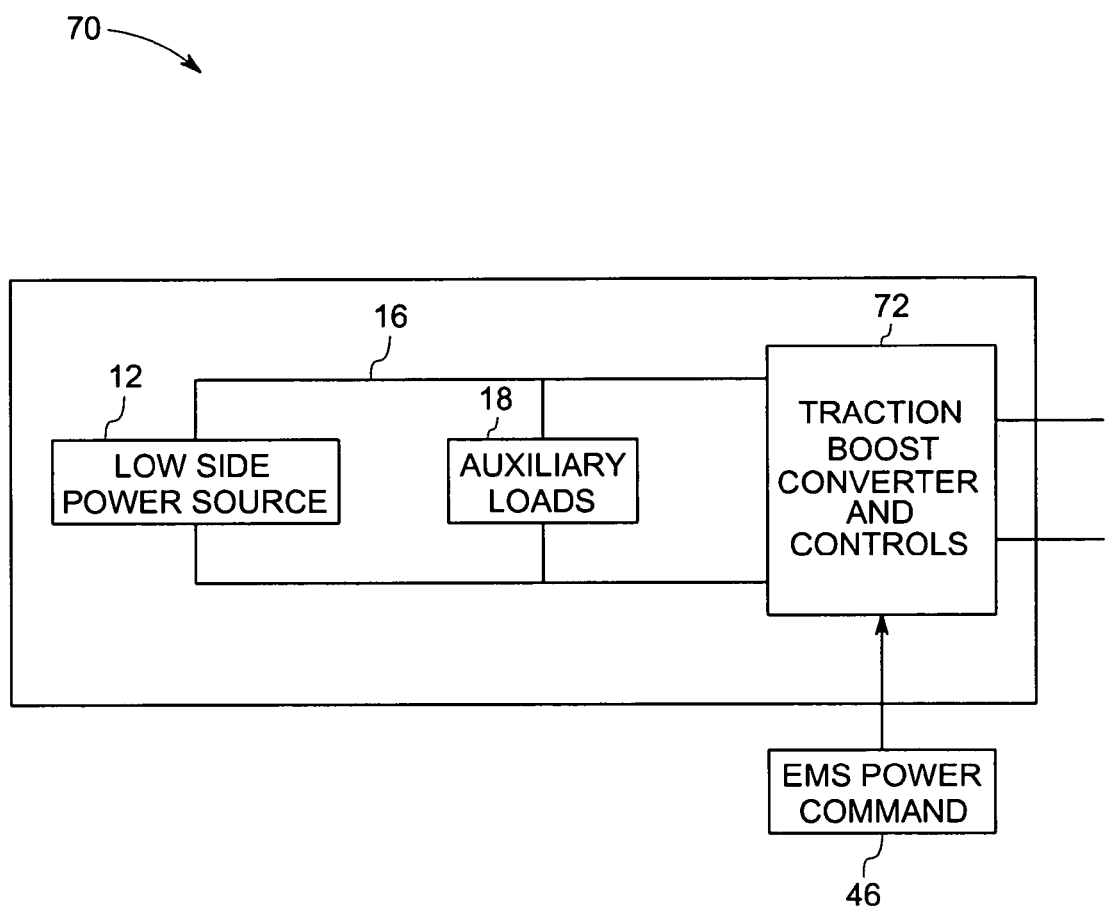
FIG. 3 is a schematic diagram of a hybrid vehicle system illustrating a low side power source and a power command input, in accordance with an exemplary embodiment of the present technique.

FIG. 3 is a schematic diagram of a hybrid vehicle system 70 illustrating a low side power source 12 and a power command input 46, in accordance with an exemplary embodiment of the present technique. As illustrated, a positive value of the power command 46 as described in FIG. 2 is delivered to the traction boost converter and controls 72 and is used to charge the high side power source 14 or the traction battery during periods of vehicle acceleration or cruise conditions. A negative value of the power command 46 occurs during regenerative braking, as described above, is delivered to the traction boost converter and controls 72 and is used to charge the low side power source 12 using energy that is produced while the traction motor 20 is acting as a generator.

The traction boost converter hardware may use a conventional switch-mode converter concept with reversible power flow as is known to those of ordinary skill in the art. A single channel bi-directional voltage traction boost converter may be comprised of two series connected electronic switches, i.e. IGBT (insulated gate bipolar transistor), or MOSFET (metal oxide semiconductor field effect transistor), where each switch is configured with an anti-parallel diode and is operated under a Pulse Width Modulated (PWM) control. In one configuration, the low-side load, possibly one or more ultracapacitors, may be connected in parallel with one of the series connected switches through a high frequency inductor. The high side of the series connected set of electronic switches may be connected to a battery. Controls in accordance with the embodiments of the present technique may allow this unit to be controlled in a closed loop power manner in response to an input power command. The bi-directional traction boost converter may allow the low side ultracapacitor load to be discharged at a given power level (controlled by an input power command), as the ultracapacitor voltage decreases, and the traction boost converter output supplies nearly the same power (minus circuit losses) to a higher side power source. Likewise, if the sign of the power command input to the traction boost converter is reversed, nearly the same power flows from the high side power source to charge the ultracapacitor as its voltage increases.

Figure 4:
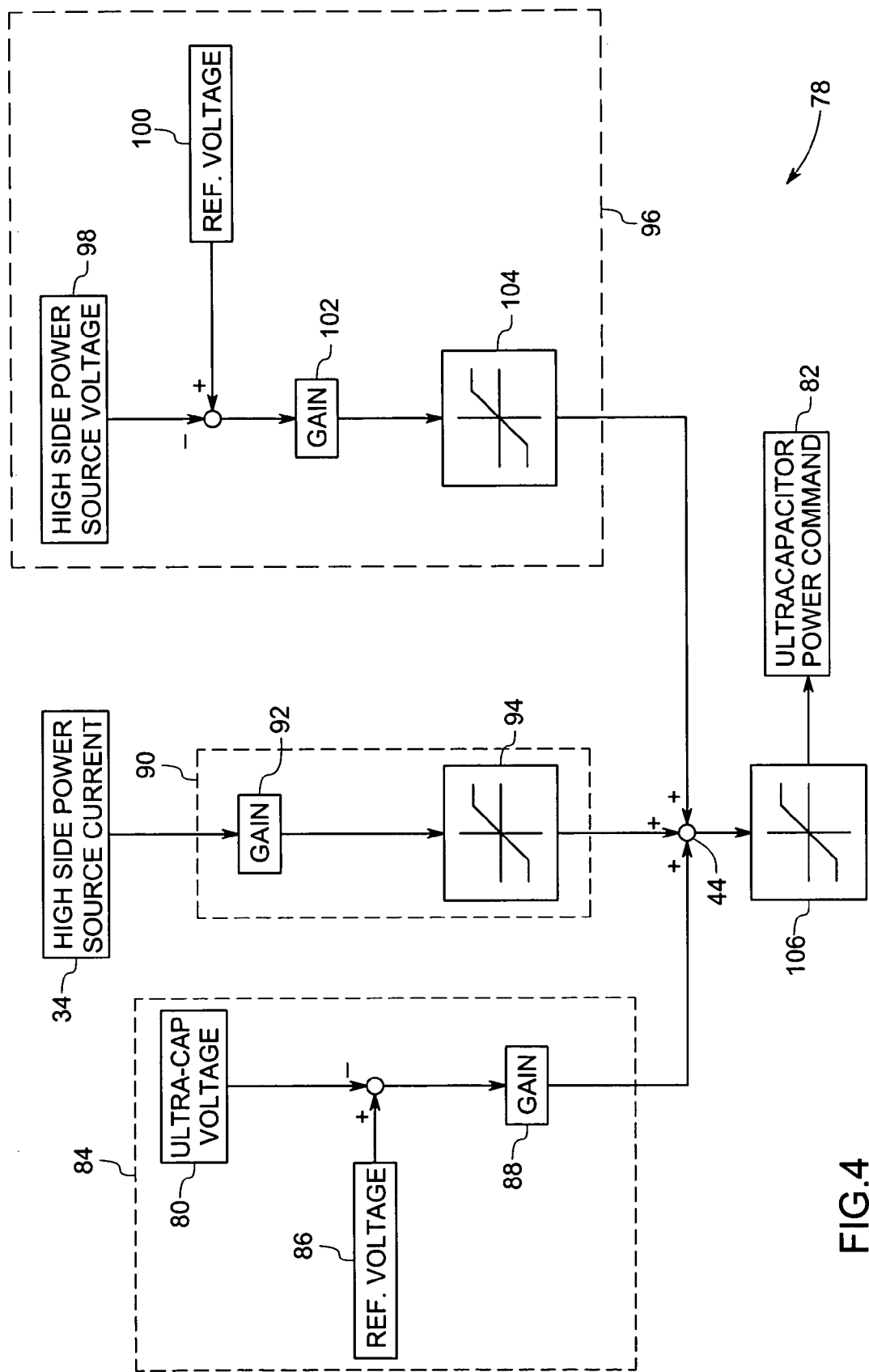
FIG. 4 is a schematic diagram of a control circuit of a hybrid vehicle system illustrating an ultracapacitor, in accordance with an exemplary embodiment of the present technique.

FIG. 4 illustrates a schematic diagram of a control circuit 78 of a hybrid vehicle system illustrating an ultracapacitor voltage 80, in accordance with a certain implementations of the present technique. In the embodiment as illustrated in FIG. 4, the control circuit 78 operates to control the ultracapacitor voltage 80 using the high side power source current 34. An ultracapacitor power command 82 is computed by an algorithm using three components as described in FIG. 2 above. The value of the ultracapacitor voltage 80 referred herein as a circuit or a first component 84 is subtracted from a reference voltage 86 multiplied by an appropriate gain 88 of similar form as 40 as described in FIG. 2. The first component is referred as a variable gain circuit similar to the one described in FIG. 2 above. The second component 90 or the fixed gain circuit of the ultracapacitor power command 82 is computed by multiplying the high side power source current 34 by a fixed gain 92 followed by an appropriate power limit function 94. As described above, the second component 90 is necessary when there is a sudden acceleration or deceleration of the vehicle and a suitable gain 92 is required followed by an appropriate power limit function 94. The third component, which is provided by an over voltage protection circuit 96, is used as part of a high side power source 14 over voltage protection, and is computed by subtracting the measured voltage 98 of high side power source 14 from a reference voltage 100, and then applying an appropriate gain 102 and power limit function 104. The ultracapacitor power command 82 is obtained by summation 44 of the above three components (84, 90, 96) with an appropriate overall power limit function 106 to obtain the ultracapacitor power command 82.

Figure 5:
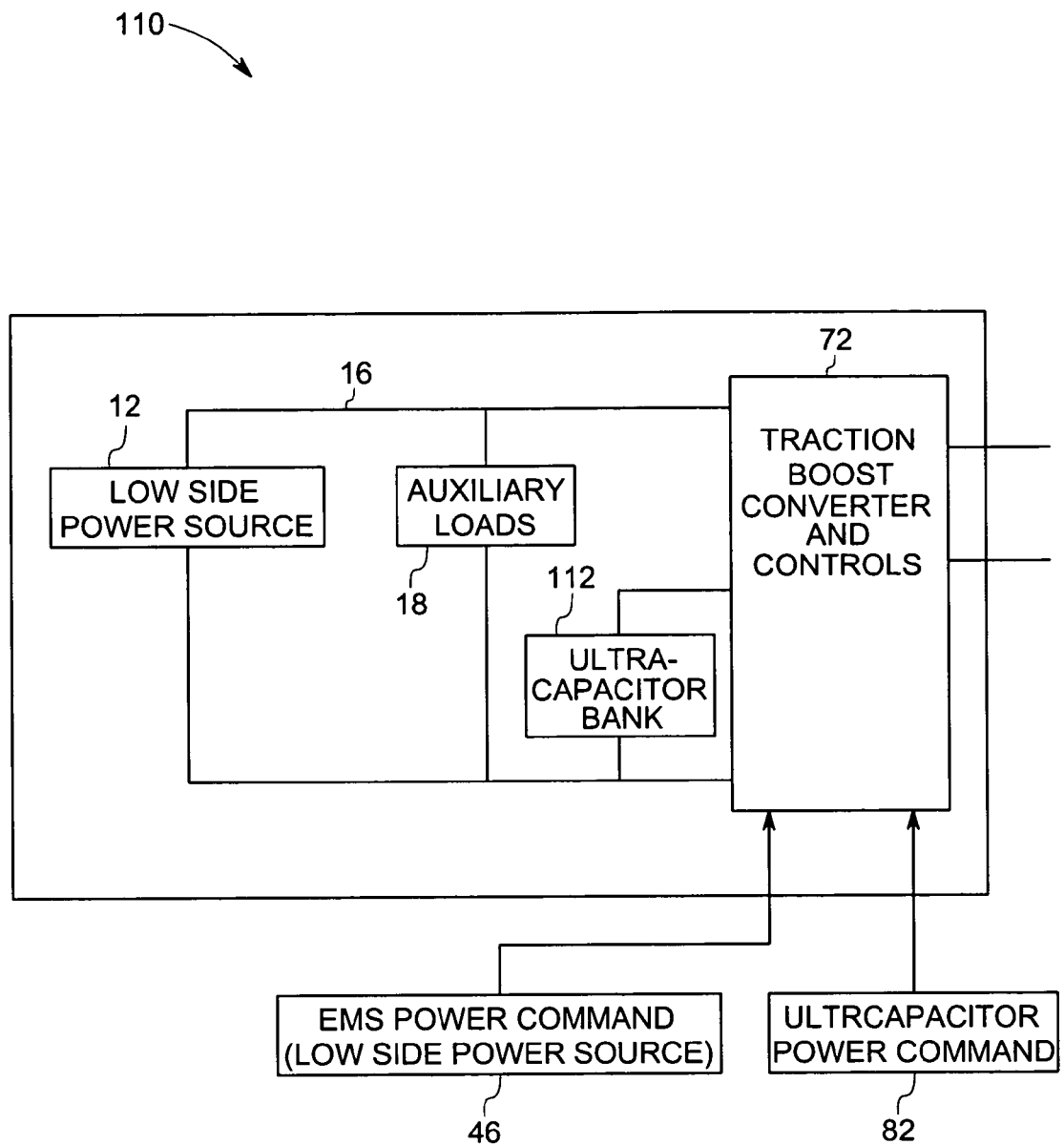
FIG. 5 is a schematic diagram of a hybrid vehicle system illustrating a low side power source and an ultracapacitor bank with power command input, in accordance with an exemplary embodiment of the present technique.

FIG. 5 illustrates a schematic diagram of a hybrid vehicle system 110 having a low side power source 12 and an ultracapacitor bank 112 with power command input 82, in accordance with an exemplary embodiment of the present technique. As illustrated above, the ultracapacitor power command 82 along with the power command 46 of the low side power source 14 are delivered to the traction boost converter and controls 72. It should be noted that the ultracapacitor bank may include one or more ultracapacitors in series configuration, a parallel configuration or combinations thereof.

As will be appreciated by those ordinary skilled in the art, the ultracapacitor 112 has high specific power and the voltage would fall as energy is removed. The above embodiment discloses the use of ultracapacitors along with the high side power storage 14. It should be noted that if the ultracapacitors placed on the high side power source, the voltage would fall as energy is extracted from the ultracapacitor. If the ultracapacitor is placed on the low side, as described in this embodiment, and is placed before the traction boost converter and controls 72, the decreasing ultracapacitor voltage during discharge is boosted to help maintain SOC of the high side power source 14. Therefore, the ultracapacitor is forced to supply power and energy even in the condition of reduced voltage. In certain implementations of the present technique, the low side of traction boost converter and controls may include multiple channels to operate multiple channels of ultracapacitors.

Figure 6:
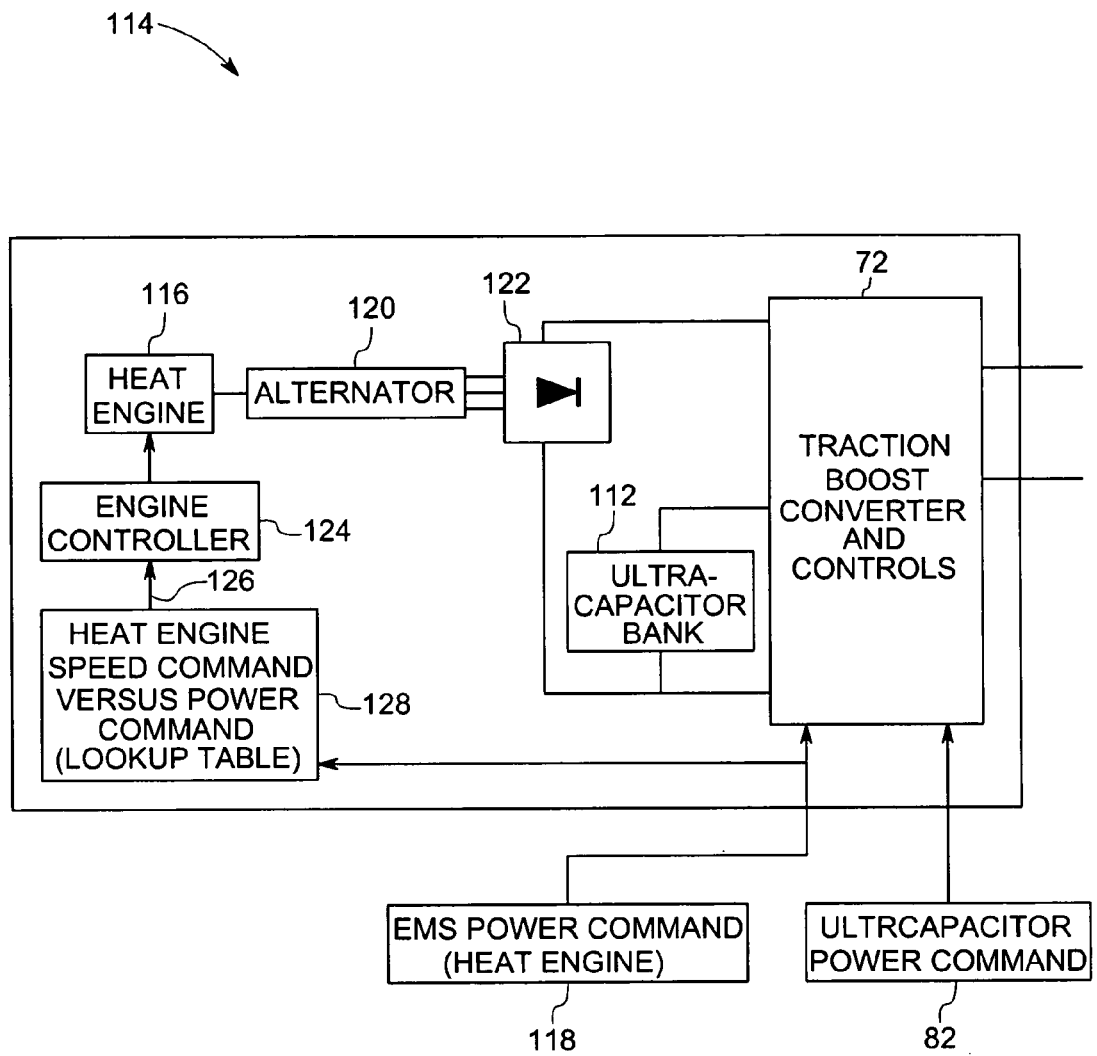
FIG. 6 is a schematic diagram of a hybrid vehicle system illustrating, a heat engine, an ultracapacitor bank and a power command input, in accordance with an exemplary embodiment of the present technique.

FIG. 6 illustrates a schematic diagram of a hybrid vehicle system 114 having a heat engine 116 and an ultracapacitor bank 112 as a low side power source. An ultracapacitor power command input 82 and a heat engine power command input 118 are delivered to the traction boost converter and controls 72 in accordance with an exemplary embodiment of the present technique. As illustrated, the system 114 includes the heat engine 116 mechanically coupled to an alternator 120. For this specific embodiment, the alternator 120 may comprise a permanent magnet type construction where the output voltage and maximum output power varies with the alternator rotational speed. The heat engine 116 may comprise any engine that burns a fuel to produce mechanical work, such as a gasoline engine, a diesel engine, a gas turbine or the like. The heat engine 116 is rotationally coupled to the alternator 120, which converts the mechanical output of the heat engine 116 into AC power. The output of the alternator 120 is coupled to the DC link 16 by a rectifier 122 in place of the low side power source 12. The rectifier 122 converts the AC output of the alternator 120 into DC power. A heat engine controller 124 controls the various parameters of the heat engine 116 based on the heat engine power command 118.

The heat engine speed command 126 may comprise output from a look up table 128 that has a data on the relationship between the heat engine speed command 126 and a power command 118. The heat engine power command 118 is also input to a heat engine speed command 126 versus power command lookup table 128. For each input value of heat engine power command 118, the lookup table 128 provides the engine speed command 126, corresponding to minimum specific fuel consumption and emissions. The heat engine power command 118 includes compensation for alternator loss versus speed and power losses in the rectifier 122.

An alternate embodiment may contain additional alternator control, depending on the specific alternator technology and construction. For example, if the alternator is a wound field construction, a field command would also be issued from the lookup table 128 to control for the alternator field for each given heat engine speed and power command through a dedicated electronic control circuit that interfaces with alternator.

Figure 7:
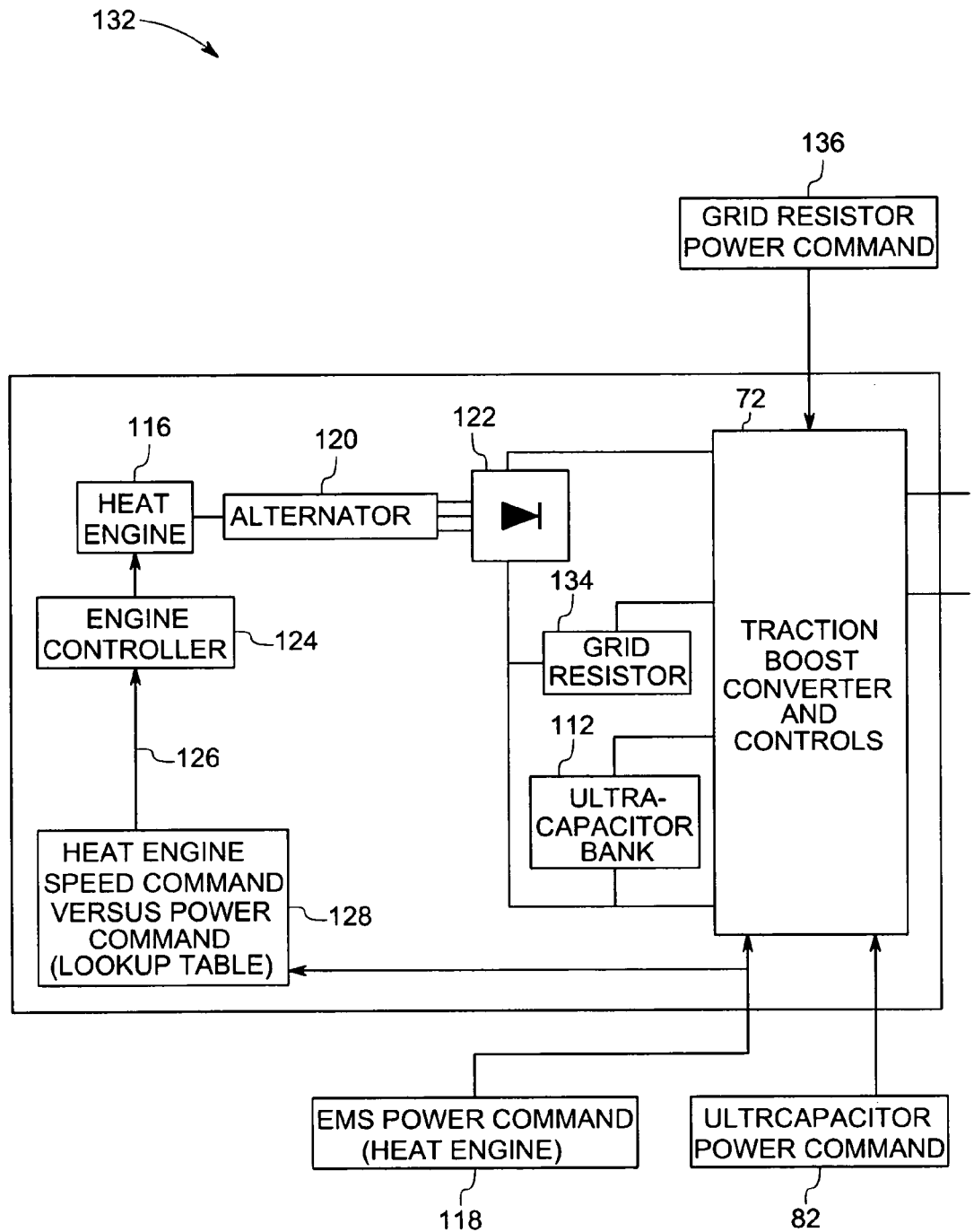
FIG. 7 is a schematic diagram of a hybrid vehicle system illustrating a heat engine, an ultracapacitor bank with power command input, a grid resistor and an heat engine power command input, in accordance with another exemplary embodiment of the present technique.

FIG. 7 illustrates a schematic diagram of a hybrid vehicle system 132 having a heat engine 116, an ultracapacitor bank 112 with a power command input 82, a grid resistor 134 with a power command input 136 and a heat engine power command input 118, in accordance with another exemplary embodiment of the present technique. The grid resistor 134 absorbs excess energy that cannot be stored within any of the power sources and ultracapacitor 112 in the hybrid vehicle system 132. In addition to this, the grid resistor 134 is used to reduce mechanical brake wear and maintenance as well as providing the over voltage protection on the power sources, traction inverters, and the traction motors. The grid resistor 134 is a high power resistor used for dynamic braking. In case when motors acts as generators, then the grid resistor 134 dissipates excess power and energy, when required. Therefore, typically, the grid resistor 134 acts as overflow to the energy storage unit i.e. the high side power source 14 and the ultracapacitor 112, for the case when these components cannot accept the regenerative power. Later, the energy storage unit can be discharged to supply power to the traction motors 20. The grid resistor power command signal 136 is supplied by the power control algorithm, as will be described below with reference to FIG. 8. Therefore, in the present embodiment, the input for the traction boost converter and controls 72 includes the grid resistor power command 136, the ultracapacitor power command 82 and the heat engine power command 118.

FIG. 8 illustrates a schematic diagram of a hybrid vehicle system having a control circuit 140 for over-voltage protection of the high side power source 14, a grid resistor power command 136 and a low pass filter 142, in accordance with an exemplary embodiment of the present technique. As illustrated above, the over voltage control circuit 140 protects the high side power source 14 from over voltage. It is computed by subtracting the measured voltage 144 of the high side power source 14 from a reference voltage 146, and then applying an appropriate gain 148 and power limit function 150. In case of over voltage, the grid resistor 134 is turned on or it can also be ramped increasing power levels to protect the high side power source 14 and DC link 17 to get damaged due to over voltage. The power limit function 150 passes through a low pass filter 142. The function of the low pass filter 142 is to reduce noise. The output from the low pass filter 142 is fed as an input to the channel of the traction boost converter 72 that controls the grid resistor 134 to form the power control algorithm 152 for the grid resistor power command 136 as described in FIG. 7.

FIG. 9 illustrates a schematic diagram of a hybrid vehicle system 156 illustrating a fuel cell 158, an ultracapacitor bank 112 with power command input 82, a grid resistor 134 with power command input 136 and a heat engine power command input 118 in accordance with yet another exemplary embodiment of the present technique. In the illustrated embodiment, similar to the one discussed in FIG. 7 above, the system 156 comprises the fuel cell 158, rather than a heat engine 116. The fuel cell 158 may comprise a plurality of fuel cell units coupled together. The fuel cell 158 is operable to produce a DC power output, which can be utilized to charge the energy storage unit via the DC link via a rectifier 159 and the traction boost converter 72. The system 156 further comprises a fuel cell control system 160, for controlling the operation of the fuel cell control system 160. Particularly, the fuel cell control system 160 may be operable to regulate operation of the fuel cell 158, such that the output DC voltage of the fuel cell 158 is within a maximum charge voltage of the low side power source 12. The fuel cell 158 may be controlled in a similar manner to the heat engine 116 described above.

Thus, the present technique, demonstrates a system and method for providing power control for energy storage systems, that provides efficient power control of multiple energy storage devices, including high specific power sources, ultracapacitors, flywheels, and multiple energy sources, including high specific-energy batteries, auxiliary power units fueled by diesel, gasoline, compressed natural gas, hydrogen, or fuel cells, used in heavy duty hybrid propulsion applications.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control circuit for an energy storage system comprising a high side power source and a low side power source, the control circuit comprising:
   (a) a variable gain circuit comprising:
      (i) an integrator to integrate a current of the high side power source to provide an integrated signal,
      (ii) a comparison circuit to obtain a comparison signal representative of a comparison of the integrated signal with a reference value of a state of charge of the high side power source,
      (iii) a gain adjustment circuit to use the comparison signal to provide a variable gain signal, wherein the gain adjustment circuit comprises a variable gain function circuit and a state of charge power limit function, wherein the variable gain function circuit receives the comparison signal from the comparison circuit and applies a variable gain function to the comparison signal to obtain the variable gain signal, and wherein the state of charge power limit function receives the variable gain signal from the variable gain function circuit and applies a limiting function to the variable gain signal;
   (b) a fixed gain circuit configured to provide a fixed gain signal based on the current of the high side power source; and
   (c) a power command creation circuit configured to combine the variable gain signal and the fixed gain signal to create a power command to control a power output of the low side power source.

2. The control circuit as recited in claim 1, wherein the high side power source comprises one or more of a battery, an ultracapacitor, a flywheel, an array of batteries and an ultracapacitor bank.

3. The control circuit as recited in claim 1, further comprising an overvoltage protection circuit for obtaining a comparison of a voltage of the high side power source with a reference voltage and for providing a high side power source gain signal for use in creating the power command.

4. The control circuit as recited in claim 1, further comprising a traction boost converter, wherein the traction boost converter is coupled between the low side power source and the high side power source.

5. The control circuit as recited in claim 4, wherein at least one of the low side power source and the high side power source is charged via an auxiliary power unit.

6. The control circuit as recited in claim 5, wherein the auxiliary power unit comprises a rectifier operable to enable AC power to flow from an AC link to a DC link to provide power to at least one traction drive motor.

7. The control circuit as recited in claim 5, wherein the auxiliary power unit is operable when the state of charge of the high side power source is below a reference value of the state of charge.

8. The control circuit as recited in claim 4, wherein the low side power source comprises a high energy battery.

9. The control circuit as recited in claim 1, wherein the high side power source comprises a high power traction battery.

10. The control circuit as recited in claim 1, wherein the low side power source is coupled to a traction boost converter, wherein at least one of the low side power source and the high side power source is charged via an auxiliary power unit, wherein the auxiliary power unit comprises a rectifier operable to enable AC power to flow from an AC link to a DC link to provide power to at least one traction drive motor, wherein the high side power source is operable to supply power to the at least one traction drive motor to supplement power from the low side power source.

11. A power system comprising:
   a low side power source coupled to a traction boost converter;
   a high side power source coupled to the traction boost converter; and
   a control circuit configured to control a power output of the low side power source using a variable gain signal, wherein the control circuit comprises a variable gain circuit comprising:
      (i) an integrator to integrate a current of the high side power source to provide an integrated signal,
      (ii) a comparison circuit to obtain a comparison signal representative of a comparison of the integrated signal with a reference value of a state of charge of the high side power source, and
      (iii) a gain adjustment circuit to use the comparison signal to provide the variable gain signal, wherein the gain adjustment circuit comprises a variable gain function circuit and a state of charge power limit function, wherein the variable gain function circuit receives the comparison signal from the comparison circuit and applies a variable gain function to the comparison signal to obtain the variable gain signal, and wherein the state of charge power limit function receives the variable gain signal from the variable gain function circuit and applies a limiting function to the variable gain signal.

12. The power system as recited in claim 11, further comprising an ultracapacitor coupled to the traction boost converter.

13. The power system as recited in claim 12, further comprising multiple channels on the low side of the traction boost converter to operate multiple channels of ultracapacitors.

14. The power system as recited in claim 11, wherein the high side power source comprises one or more of a battery, an ultracapacitor, a flywheel, an array of batteries and an ultracapacitor bank.

15. A method for controlling an energy storage system comprising a high side power source and a low side power source coupled by a boost converter, the method comprising:
   integrating a current of the high side power source to provide an integrated signal,
   obtaining a comparison signal based on a comparison of the integrated signal with a reference value of a state of charge of the high side power source;
   using the comparison signal to provide a variable gain signal, wherein providing the variable gain signal comprises applying a variable gain function to the comparison signal to obtain the variable gain signal, and applying a limiting function to the variable gain signal;
   providing a fixed gain signal based on current from the high side power source; and
   combining at least the variable gain signal and the fixed gain signal to create a power command to control a power output of the low side power source.

16. The method as recited in claim 15, further comprising operating the high side power source to supply power to at least one traction drive motor to supplement power supplied from the low side power source to the at least one traction drive motor.

17. The method as recited in claim 16, further comprising operating an auxiliary power unit to charge the low side power source and the high side power source.

* * * * *